United States Patent [19]

Roberts

[11] Patent Number: 4,674,348
[45] Date of Patent: Jun. 23, 1987

[54] SLOW SPEED PINION DRIVE

[75] Inventor: Ian S. Roberts, Rynfield, South Africa

[73] Assignee: David Brown Gear Industries (Proprietary) Limited, South Africa

[21] Appl. No.: 765,054

[22] Filed: Aug. 12, 1985

Related U.S. Application Data

[63] Continuation-in-part of Ser. No. 374,380, May 3, 1982, abandoned.

[30] Foreign Application Priority Data

May 4, 1981 [ZA] South Africa .................. 81/2947

[51] Int. Cl.$^4$ ........................................... F16H 57/02
[52] U.S. Cl. ................................. 74/411; 74/421 A; 74/640; 248/676
[58] Field of Search ............ 74/640, 390, 411, 421 A, 74/421 R, 423; 248/638, 676

[56] References Cited

U.S. PATENT DOCUMENTS

| | | | |
|---|---|---|---|
| 1,496,867 | 6/1924 | Bee | 74/421 R |
| 1,909,435 | 5/1933 | Uggla | 248/600 R X |
| 2,076,015 | 4/1937 | Broome | 74/421 A |
| 2,441,901 | 5/1948 | Petersen | 74/421 R |
| 2,596,794 | 5/1952 | Schmitter | 74/421 A |
| 2,878,909 | 3/1959 | Munschauer | 74/421 R X |
| 2,999,398 | 9/1961 | Christian | 74/421 R |
| 3,926,064 | 12/1975 | Durand | 74/421 R |

FOREIGN PATENT DOCUMENTS

| | | | |
|---|---|---|---|
| 557271 | 3/1960 | Belgium | 248/676 |
| 917763 | 9/1954 | Fed. Rep. of Germany | 248/676 |
| 1164188 | 2/1964 | Fed. Rep. of Germany | 74/411 |
| 2416319 | 10/1975 | Fed. Rep. of Germany | 248/638 |

Primary Examiner—Lawrence Staab
Assistant Examiner—Dwight G. Diehl
Attorney, Agent, or Firm—Ladas & Parry

[57] ABSTRACT

A slow speed pinion drive has a reduction gear box interposed between a prime mover and a pinion mounted on a pinion shaft and meshing with a gear ring on a slowly rotating machine. The prime mover is connected to the gear box through a flexible connection while the gear box is mounted directly on the pinion shaft and is supported by the pinion shaft and by an adjustable prop disposed in eccentric fashion to the pinion shaft.

4 Claims, 4 Drawing Figures

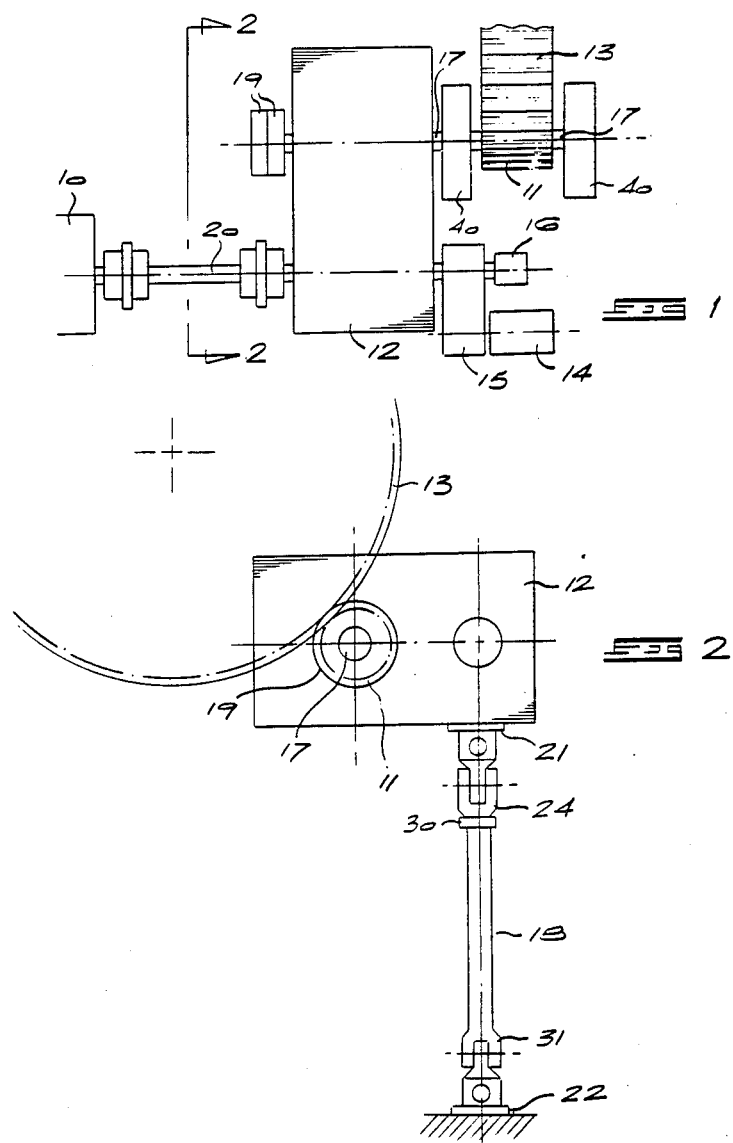

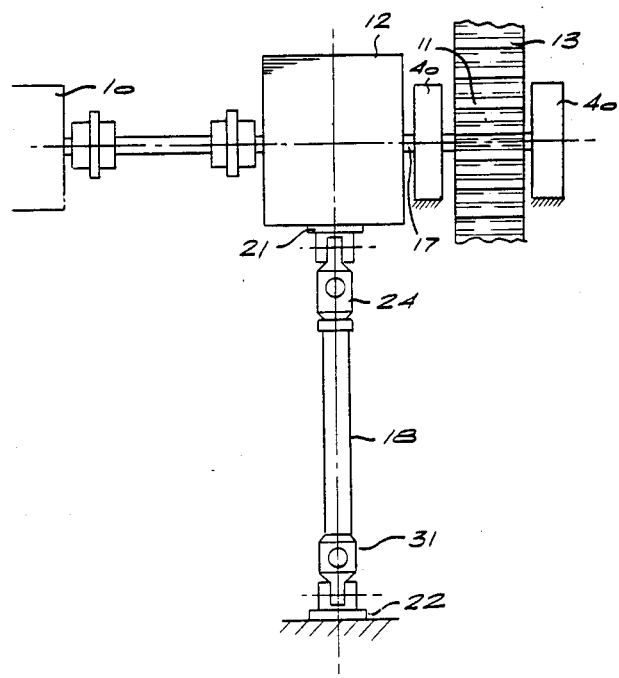

SLOW SPEED PINION DRIVE

BACKGROUND OF THE INVENTION

This invention relates to a slow speed pinion drive of the kind used to drive large rotating bodies such as grinding mills and rotary kilns and is a continuation-in-part of U.S. patent application Ser. No. 374,380 filed May 3, 1982 now abandoned.

A large grinding mill is driven at a relatively slow speed from a powerful electric motor which rotates at a relatively high speed. In order to achieve the speed differential a reduction gearbox is mounted between the motor and the pinion which engages a girth gear around the mill which is a large cylinder. Usually the gearbox is mounted to the pinion shaft which passes through a hollow shaft on the gearbox and the two shafts are joined together at their free ends by means of shrink discs.

In conventional practice each of the motor, the gearbox and the pinion bearing pedestals are mounted on massive concrete supports. It takes many weeks to adjust the three dimensional alignment of the relevant shafts. The foundation work itsewlf is expensive and the weeks of installation work also adds significantly to the final costs.

An object of the invention is to reduce the cost of this kind of installation.

In the art of fitting gearboxes to large rotating bodies such as grinding mills, the following terms have the well known meanings given below:

"Girth gear"—the ring gear with external teeth which surrounds a rotating body such as a grinding mill.

"Barring motor", "barring gearbox" and "barring clutch—are terms used for a motor, a gearbox and a clutch built into the main gearbox and used during installation and adjustment to effect very small movements of the rotating body. "Shrink discs"—elements which are shrunk on to shafts to connect a hollow shaft with a solid shaft passing through the hollow shaft.

In this description and in the appended claims the above terms have the meanings given above.

SUMMARY OF THE INVENTION

According to the invention a reduction gearbox interposed between a prime mover and a pinion meshing with a girth gear surrounding a slowly rotating machine, the pinion being mounted on a pinion shaft and there being a drive connection between the prime mover and the gearbox, has the improvement that the gearbox is mounted directly to the pinion shaft and is supported on that shaft and an adjustable prop eccentric to the pinion shaft while the drive connection is a flexible one.

This is in contrast to the conventional practice in which the gearbox is fully supported on a base plate resting on a raised concrete pedestal.

In the preferred form of the invention the prop is provided with a head and preferably also a foot which has limited universal movement relatively to the prop stem. This may be achieved by connecting the head or the foot, as the case may be, to the stem by a pin and cone ring mounting of a known type.

DESCRIPTION OF THE DRAWINGS

FIG. 1 is a diagrammatic plan view of an installation according to the invention, FIG. 2 is a view in the direction of the arrow 2—2 in FIG. 1, FIG. 3 is a front view of FIG. 1, with certain parts left off.

DESCRIPTION OF AN EMBODIMENT

Figure 4:
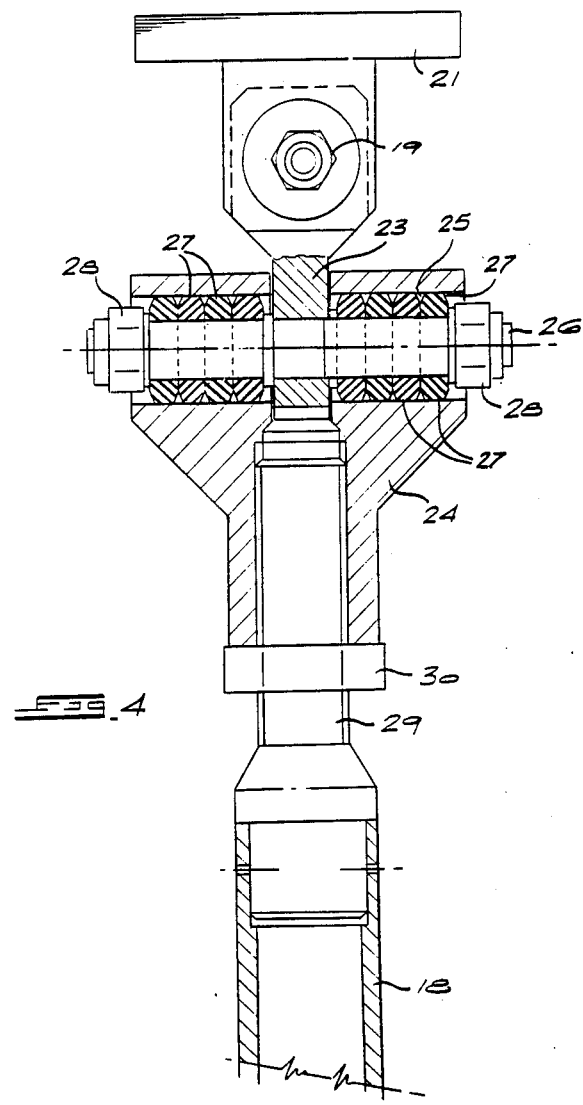
FIG. 4 is a view mostly in longitudinal section through the head of a prop.

In the embodiment a motor 10 drives a pinion 11 through a reduction gearbox 12. The pinion is mounted in bearings which in a conventional manner are fixed to pedestals 40. The pinion 11 is engaged with a girth gear 13 on, say, a grinding mill. The gearbox 12 is fitted with a conventional assembly of a barring motor 14, a barring gearbox 15 and a barring clutch 16 for use during relining or repair of the mill. The latter do not appear in FIG. 3.

Looking at FIGS. 2 and 3 it will be seen that the gearbox 12 is not supported on any conventional mountings. It is directly mounted to the pinion shaft 17 at one end and rests on the prop 18. Shrink discs 19 are fitted to the free end of the shaft 17.

The motor 10 is connected to the gear box 12 by a universal shaft 20. The prop 18 has a head bracket 21 for securing to the underside of the gear box 12 and a foot bracket 22 for fixing to a suitable foundation. FIG. 4 shows the head bracket fixing in greater detail.

The bracket 21 is pinned by means of a bolt 19 to a member 23 which enters a turnbuckle 24 formed with a transverse passage 25. The member 23 is also formed with a transverse hole. A pin 26 passes through the hole and is positioned in the passage 25 with a series of cone rings 27 compressed in the passage 25 by means of nuts 28. The result is that the turnbuckle 24 has limited resilient tilting movement relatively to the bracket 21.

The turnbuckle 24 screws on to an extension 29 on the stem 18 of the prop and is locked in any adjusted position by means of a lock nut 30.

The foot bracket 21 is similarly secured to a head 31 which, unlike the turnbuckle 24 is fixed to the stem 18.

It will be appreciated that the installation of the gear box 12 and the lining up of the various parts with the use of the apparatus described above is a relatively simple matter which could be done in a matter of days rather than the many weeks now required. Also the relative skills of the members of the installation team need not be so high as with conventional installation methods. With the above described embodiment, a major adjustment is through the turnbuckle 24. In the prior art this adjustment is by means of shims placed under heavy machines.

I claim:

1. A reduction gearbox interposed between a prime mover and a pinion meshing with a girth gear surrounding a slowly rotating machine, the pinion being mounted on a pinion shaft and there being a drive connection between the prime mover and the gearbox, with the improvement that the gearbox is mounted directly to the pinion shaft and is supported on that shaft and on an adjustable prop eccentric to the pinion shaft while the drive connection is a flexible one, and in which the prop comprises a head, a stem and a foot, the head having limited universal movement relatively to the stem.

2. The gearbox claimed in claim 1 in which the foot has limited universal movement relatively to the stem.

3. The gearbox claimed in claim 2 in which that one of the head and the foot which has limited universal movement relatively to the stem is connected to the stem by a pin and cone ring mounting.

4. The gearbox claimed in claim 1 in which that one of the head and the foot which has limited universal movement relatively to the stem is connected to the stem by a pin and cone ring mounting.

* * * * *